(12) United States Patent
Li

(10) Patent No.: US 8,760,104 B2
(45) Date of Patent: Jun. 24, 2014

(54) DETERMINING AVERAGE CURRENT DRAWN BY A MOTOR

(75) Inventor: Jiang Li, Birmingham (GB)

(73) Assignee: TRW Limited, West Midlands (GB)

( * ) Notice: Subject to any disclaimer, the term of this patent is extended or adjusted under 35 U.S.C. 154(b) by 505 days.

(21) Appl. No.: 12/531,124

(22) PCT Filed: Mar. 14, 2008

(86) PCT No.: PCT/GB2008/000898
§ 371 (c)(1),
(2), (4) Date: Sep. 14, 2009

(87) PCT Pub. No.: WO2008/110817
PCT Pub. Date: Sep. 18, 2008

(65) Prior Publication Data
US 2010/0109592 A1    May 6, 2010

(30) Foreign Application Priority Data
Mar. 14, 2007    (GB) .................................. 0704877.0

(51) Int. Cl.
*G05B 11/28* (2006.01)

(52) U.S. Cl.
USPC .......................................... 318/599; 318/811

(58) Field of Classification Search
USPC ................................................ 318/599, 811
See application file for complete search history.

(56) References Cited

U.S. PATENT DOCUMENTS

| 5,341,286 | A | 8/1994 | Inoue et al. | |
|---|---|---|---|---|
| 6,172,509 | B1 * | 1/2001 | Cash et al. | 324/546 |
| 6,191,966 | B1 | 2/2001 | Yu | |
| 6,842,354 | B1 * | 1/2005 | Tallam et al. | 363/98 |
| 7,463,464 | B2 * | 12/2008 | Quirion et al. | 361/31 |
| 2003/0006749 | A1 | 1/2003 | Rollman | |
| 2006/0176059 | A1 | 8/2006 | Mir et al. | |
| 2007/0040523 | A1 | 2/2007 | Quirion et al. | |

FOREIGN PATENT DOCUMENTS

| EP | 1609695 A2 | 12/2005 |
|---|---|---|
| EP | 1681697 A2 | 7/2006 |
| EP | 2753108 A2 | 2/2007 |

OTHER PUBLICATIONS

Blaabjerg, Frede et al., "Single Current Sensor Technique in the DC Link of Three-Phase PWM-VS Inverters: A Review and a Novel Solution", pp. 1241 thru 1253; IEEE Transactions on Industry Applications, vol. 33. No. 5, Sep./Oct. 1997; 0093-9994/97$10.00 © 1997 IEEE.

Search Report for Application No. GB 0704877.0; date of search: Jun. 30, 2007.

* cited by examiner

*Primary Examiner* — Erick Glass
(74) *Attorney, Agent, or Firm* — MacMillan, Sobanski & Todd, LLC

(57) ABSTRACT

A method of determining the average current drawn by an electric motor, the motor comprising a plurality of phases, the method comprising: driving each phase of the motor with cyclic pulse width modulated drive signals having a first state and a second state, and a duty ratio indicative of the ratio of time spent in the first to second states within a cycle, determining the current flowing through each phase at an instant in the cycle; and determining the average current drawn by the motor over at least one cycle by combining the currents flowing through each phase with the duty ratios for each phase. The method may be embodied in a combination of a motor and a drive circuit for the motor, such as can be used in an Electric Power Assisted Steering system.

22 Claims, 5 Drawing Sheets

DETERMINING AVERAGE CURRENT DRAWN BY A MOTOR

CROSS-REFERENCE TO RELATED APPLICATIONS

This application is a national stage of International Application No. PCT/GB2008/000898 filed Mar. 14, 2007, the disclosures of which are incorporated herein by reference, and which claimed priority to Great Britain Patent Application No. 0704877.0 filed Mar. 14, 2007, the disclosures of which are incorporated herein by reference.

BACKGROUND OF THE INVENTION

This invention relates to a method of determining the average current drawn by an electric motor, and to related apparatus.

In many automotive applications, it is useful to be able to provide a measure of the battery current draw whilst a system is in operation. For large electrical components such as an electric power assisted steering (EPAS) system, it is common to transmit the battery current information to other components on the vehicle to enable load-levelling to be carried out to improve battery/alternator performance.

For cost-sensitive automotive applications, this ideally needs to be done without adding any cost to the system. However, for systems such as permanent magnet AC motor drives which use a single current sense series with the motor phases to measure the three phase currents, (for example, the circuit shown in EP 1 083 650 A2) it is not easy to directly measure the battery current, due to large fluctuations in drive current. An average current measurement is desirable.

BRIEF SUMMARY OF THE INVENTION

One solution for single current sensor systems is to use external analogue hardware to filter the signal from the single current sensor to give a measure of the average current. However, such an approach is not trivial since the switching dynamics on the signal and noise make it difficult to provide an accurate measurement of the average value. Furthermore, this requires extra components, which can have an impact on costs.

A further option is described in EP 1 609 695 A2. This involves modelling the motor current from the power consumed. However, this is unnecessarily complicated, and for accurate current predication requires knowledge of both voltage and current phases and magnitudes, resistances and inductances of the motor, rotor position and battery voltage.

According to a first aspect of the invention, we provide a method of determining the average current drawn by an electric motor, the motor comprising at least one phase, the method comprising:

- driving each phase of the motor with cyclic pulse width modulated (PWM) drive signals having a first state and a second state, and a duty ratio indicative of the ratio of time spent in the first to second states within a cycle,
- determining the current flowing through each phase at an instant in the cycle;
- and determining the average current drawn by the motor over at least one cycle by combining the currents flowing through each phase with the duty ratios for each phase.

This enables a single current measurement from each phase to be used to generate an average current draw over a whole cycle. Indeed, preferably only one current measurement per cycle is taken and used in determining the average current. Furthermore, hardware to measure the current flowing one or more of the phases is often found in electric motors, whilst the duty cycle is often known as it is set by the drive circuitry of the motor. In such a case, a value for the average current drawn by the motor can be calculated without necessarily introducing any new items of hardware. The determination of the average current may then be carried out in a drive circuit of the motor.

The step of determining the current in each phase may comprise measuring the current flowing in at least one phase. Where the motor has a plurality of phases, the method may comprise measuring the current in each phase, typically at some instant in the PWM cycle, using a current sensor in each phase. Alternatively, where a single current sensor is provided in series with the phases, the drive signals applied to the motor may be arranged such that there exists for one, more or all of the phases a window in time in the drive signal where the current through the current sensor is representative of the current flowing through the relevant phase; the measurement of the current in each relevant phase may be taken during the relevant window.

In one embodiment, the current flowing through all but one phase is measured, and the current flowing in the remaining phase is determined from the measured currents. This is particularly applicable where the phases of the motor are connected at a star point, as the sum of the currents flowing into the star point must equal the sum flowing out.

The determined currents and the duty ratios may be combined by taking the product of the duty cycle and the current for each phase. This may result in an average phase current for each phase. The average may be determined by combining the average phase currents additively, for example by summing them.

Where the motor is controlled by a drive circuit, the drive circuit may calculate a demanded duty ratio for each phase. In the simplest embodiment, the demanded duty ratios may be used as the duty ratio for the relevant phrases. Where switches are used to switch the drive signals of each phase from first state to second state, for increased accuracy it may be advantageous to calculate a modified duty ratio from the demanded duty ratio, by allowing for the switching time for the switches in the duty cycle of each state. This is a so-called "dead-time" compensation. Typically, the dead time compensation would involve either decreasing or increasing the time that the drive signal was considered to be in the first or second state, depending on the characteristics of the switch. The modified duty ratio may then be used as the duty ratio in calculating the average current.

Furthermore, the average current determined by the method may further comprise a component indicative of the current consumed by the components of the motor other than the phases. Typically, these components comprise any of the drive circuit, the switches, a power filter and so on. However, this component may be included in the average by adding a constant value to the combined duty ratio and current value. The constant may be determined when the motor is at zero speed and no, or substantially no, current is flowing in the windings.

Where the motor has a plurality of phases, the instant in the cycle for which the current for each phase is determined need not be the same for each phase, although it may be. Typically, determination of the current for each phase will determine the current in that phase when that phase is being driven by a drive signal in the same state as that of the other phases at the instant that the other phases' currents are determined; for example, the instants for which the current is determined may all be when the phase in question is being driven in the first state, or vice versa.

According to a second aspect of the invention, there is provided a combination of a motor and a drive circuit for the motor, in which the motor comprises at least one phase, in which the drive circuit is arranged so as to, in use, generate cyclic pulse width modulated (PWM) drive signals for each phase, each drive signal having a first state and a second state and a duty ratio indicative of the ratio of time spent in the first to second states within a cycle, and to apply these drive signals to the relevant phases, in which the combination further comprises current sensing circuitry arranged to determine the current flowing through each phase at an instant in the cycle;

and in which the drive circuit comprises an average current determining circuit, which takes as inputs the duty ratio and the instant current determination for each phase, and is arranged so as to output, in use, an average current drawn by the motor over at least one cycle.

This enables a single current measurement from each phase to be used to generate an average current over a whole cycle. Indeed, in use, the current sensing circuitry may be arranged so as to make only one current measurement per cycle in use in determining the average current.

The current sensing circuitry may comprise a current sensor for each phase. However, where the motor has a plurality of phases, the current sensing circuitry may instead comprise a single current sensor in series with the phases; the drive circuitry may then be arranged so that in use the drive signals applied to the phases by the drive circuit are arranged such that there exists for at least one phase a window in time in the drive signal where the current through the current sensor is representative of the current flowing through the relevant phase; a measurement of the current flowing through the relevant phase may be taken during the relevant window.

In one embodiment, the current flowing through all but one phase is measured, and the current flowing in the remaining phase is determined from the measured currents. This is particularly applicable where the phases of the motor are connected at a star point, as the sum of the currents flowing into the star point must equal the sum flowing out.

The average current determining circuit may comprise a product circuit, for each phase which has inputs for the duty cycle and the current for each phase and outputs, in use, an average phase current for that phase. The average current determining circuit may further comprise a summing circuit, which has inputs for the average phase currents and outputs in use an additive combination—typically the sum—of the inputs to produce the average current drawn by the motor.

The drive circuit may be arranged to calculate a demanded duty ratio for each phase. In the simplest embodiment, the demanded duty ratios may be used as the duty ratio for the relevant phases. The drive circuit may comprise switches arranged to switch, in use, the drive signals of each phase from first state to second state; in such a case, for increased accuracy, the average current determining circuit may be arranged so as to calculate in use a modified duty ratio from the demanded duty ratio, by allowing for the switching time for the switches in the duty cycle of each state. This is a so-called "dead-time" compensation. Typically, the dead time compensation would involve either decreasing or increasing the time that the drive signal was considered to be in the first or second state, depending on the characteristics of the switch. The modified duty ratio may then be used as the duty ratio in calculating the average current.

Furthermore, the summing circuit may, in use, add a further component indicative of the current consumed by the components of the motor other than the phases. Typically, these components comprise any of the drive circuit, the switches, a power filter and so on. However, the component may be a constant value, which may be determined by the average current determining unit when the motor is at zero speed and no, or substantially no, current is flowing in the windings.

Where the motor has a plurality of phases, the instant in the cycle for which the current for each phase is determined need not be the same for each phase, although it may be. Typically, determination of the current for each phase will determine the current in that phase when that phase is being driven by a drive signal in the same state as that of the other phases at the instant that the other phases' currents are determined; for example, the instants for which the current is determined may all be when the phase in question is being driven in the first state, or vice versa.

At least part of the drive circuitry may form part of an application specific integrated controller (ASIC). The motor may be a permanent magnet motor, may be brushless, may have three phases, and may be star wound.

The combination may be arranged to be operated according to the first aspect of the invention.

According to a third aspect of the invention, there is provided an electric power assisted steering system, comprising a combination according to the second aspect of the invention and a steering mechanism for a vehicle, in which the motor is coupled to the steering mechanism for applying an assistance torque thereto.

This is particularly advantageous where the steering system is arranged to be powered by a battery of a vehicle, as it is quite often desired for the other electric circuits in a vehicle to have knowledge of the current being drawn from the battery at a given time.

Other advantages of this invention will become apparent to those skilled in the art from the following detailed description of the preferred embodiments, when read in light of the accompanying drawings.

DETAILED DESCRIPTION OF THE INVENTION

Figure 1:
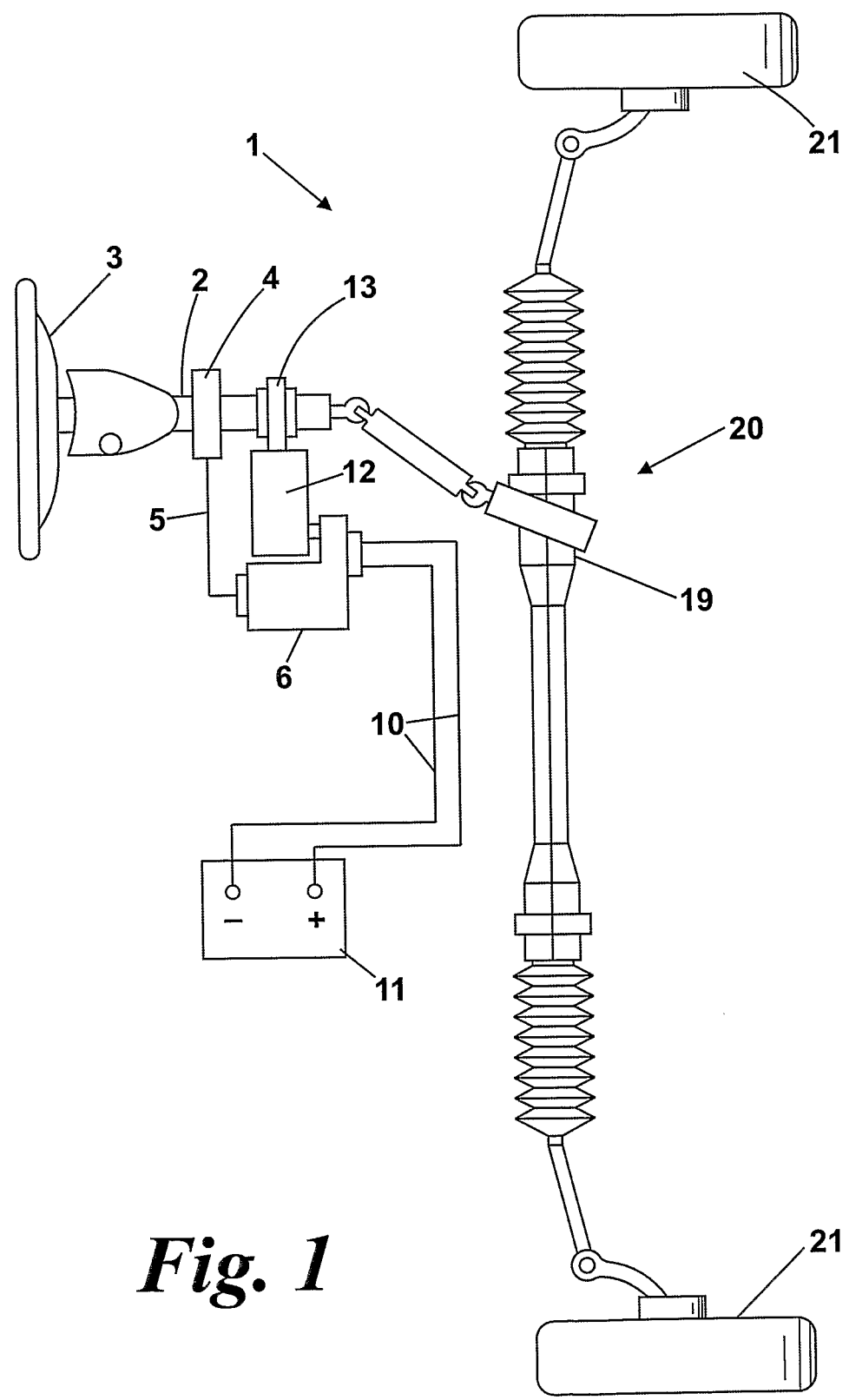
FIG. 1 shows an electric power assisted steering system according to an embodiment of the present invention.

FIG. 1 shows an electric power assisted steering system according to the present invention. This shows a steering mechanism 20 for a vehicle, comprising a steering wheel 3 coupled to a steering shaft 2. The shaft 2 engages a steering rack 19 such that rotation of the wheel 3 and hence the shaft 2 drives steering rack 19 laterally. Such movement of the rack 19 causes the wheels 21 to rotate about a roughly vertical axis, as is well known in the art.

In order to assist the driver, an assistance motor 12 is provided. This is coupled to shaft 2 by means of a gearbox and coupling 13. The motor 12 is provided with a drive circuit 6, which takes current from battery 11 in order to drive motor 12. A torque sensor 4 on steering shaft 2 senses the level of torque in the steering shaft and transmits the measured torque level through line 5 to drive circuit 6. This then causes the motor 12 to apply an amount of assistance torque to the steering shaft 2 and hence helps the driver of a vehicle turn the wheels to steer the vehicle.

The battery 11 is the main battery of the vehicle, and so is constantly being used by all manner of circuits in the vehicle, including the engine control unit (ECU), passenger and cooling fans, heated windscreens, vehicle lights and the like. It is desirable that an estimate of the current being consumed by each of the components using the battery is known at any given time. The drive circuit is therefore able, as described below, to work out the average current drawn by it at a given time.

Figure 2:
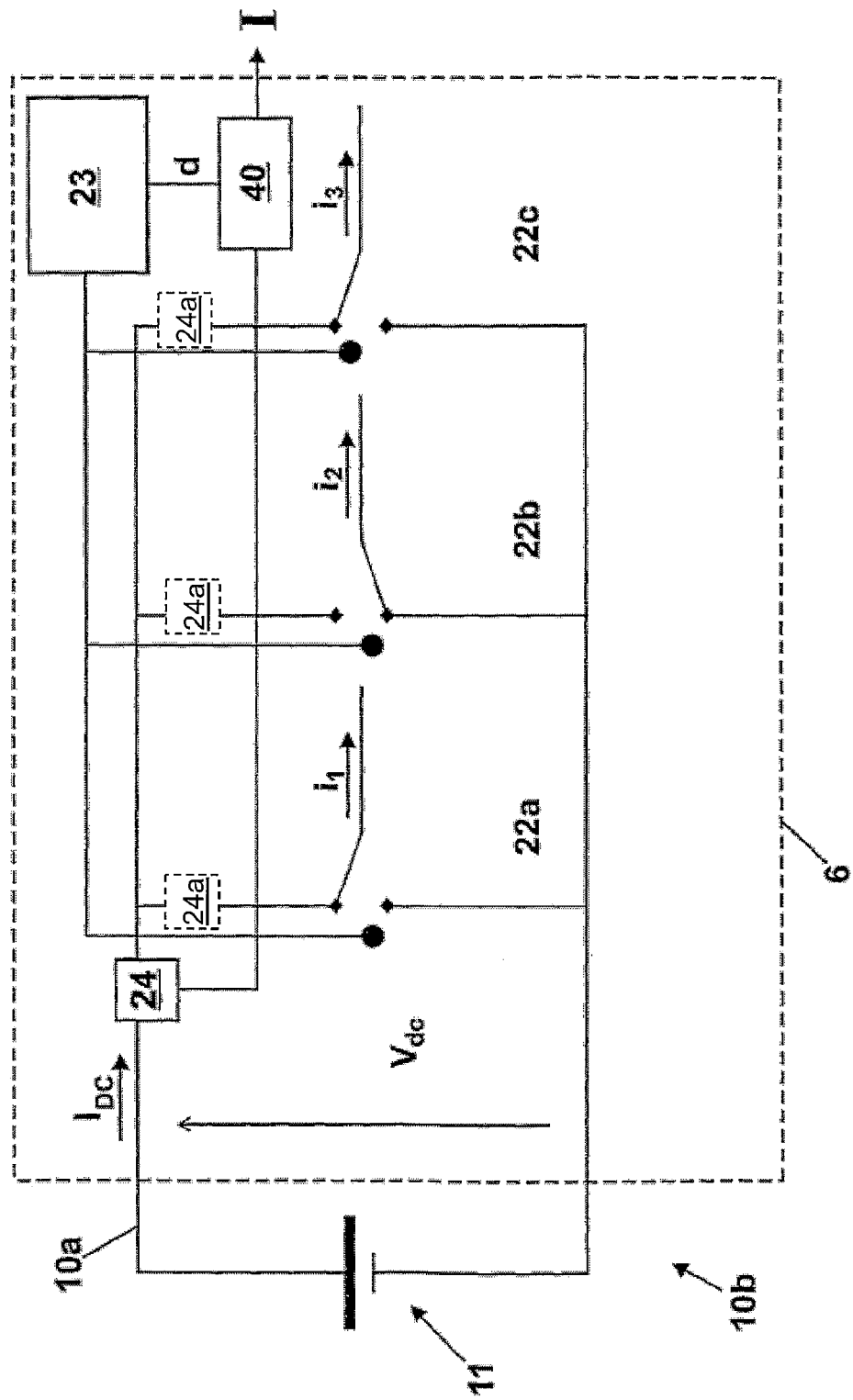
FIG. 2 shows a circuit diagram depicting the drive circuit of the steering system of FIG. 1.
Figure 4:
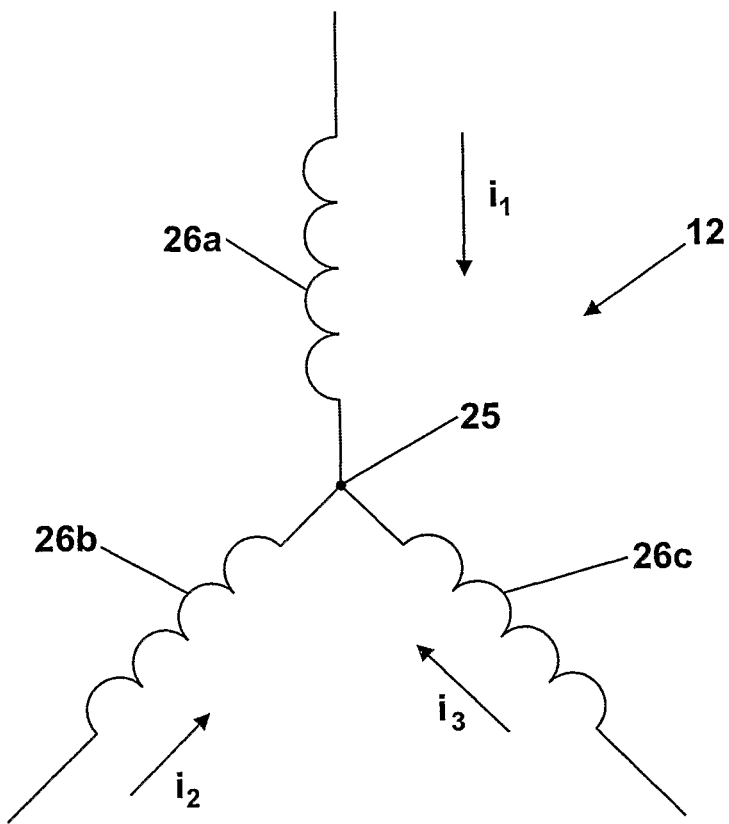
FIG. 4 shows a circuit diagram depicting the motor of FIG. 1.

A simplified view of the operation of the drive circuit can be seen in FIG. 2 of the accompanying drawings. The motor 12 used in the steering system is a three-phase, star wound motor; it is shown in FIG. 4 of the accompanying drawings. Accordingly, three sets of switches 22a, 22b, 22c, are provided. Each set of switches selectively connects one phase of the motor 12 to either the positive 10a or negative 10b line from the battery 11. In practice, each set of switches comprises a pair of FETs in series, with the phase connected between the FETs. Such a system is well known and described in such documents as EP 1 083 650 A2.

The switches are controlled by control circuit 23. This takes the torque in the steering column as measured by sensor 4, and possibly other inputs, and determines an assistance torque to be applied. It then converts this into a PWM (pulse width modulated) signal having a certain duty ratio for each phase. Taking the time that a given phase n is connected to the top battery line 10a as $t_{n\ on}$, and the PWM cycle period as $T_{PWM}$, then the duty ratio $d_n$ is $t_{n\ on}/T_{PWM}$. An example of the drive signals applied to the motor can be seen in FIG. 3 of the accompanying drawings; this shows how each phase is switched between high and low voltage.

Also part of the drive circuit is a current sensor 24. This measures the current flowing into the motor, and provides an output to the control circuit 23. This is used as described below to determine the average current flowing into the motor over a PWM cycle.

As can be seen from comparing FIGS. 2 and 4 of the accompanying drawings, the current flowing into each of the phases 26a, 26b, 26c can be depicted as $i_1$, $i_2$ and $i_3$, with positive values of each indicating current flow into the motor. Given that the motor is star wound, then application of Kirchoff's current law at the star point 25 means that the sum of $i_1$, $i_2$ and $i_3$ must be zero.

Also, if only one phase is connected to the same battery line 10a (the positive line) as the current sensor 24, then the current flowing through the current sensor is the same as the current flowing through that phase. This means that by correct arrangement of the PWM drive signals, the current flowing in the current sensor at separate intervals through the cycle will be indicative of the current flowing through the current each of the phases. Similarly, by conservation of current, if only one phase is connected to the other battery line 10b, then the current flowing through the current sensor will be indicative of current flowing through that phase, but in the opposite sense to that shown in FIG. 4. Alternately, the single current sensor 24 could be replaced with individual current sensors 24a in each phase, as shown in FIG. 2.

Figure 3:
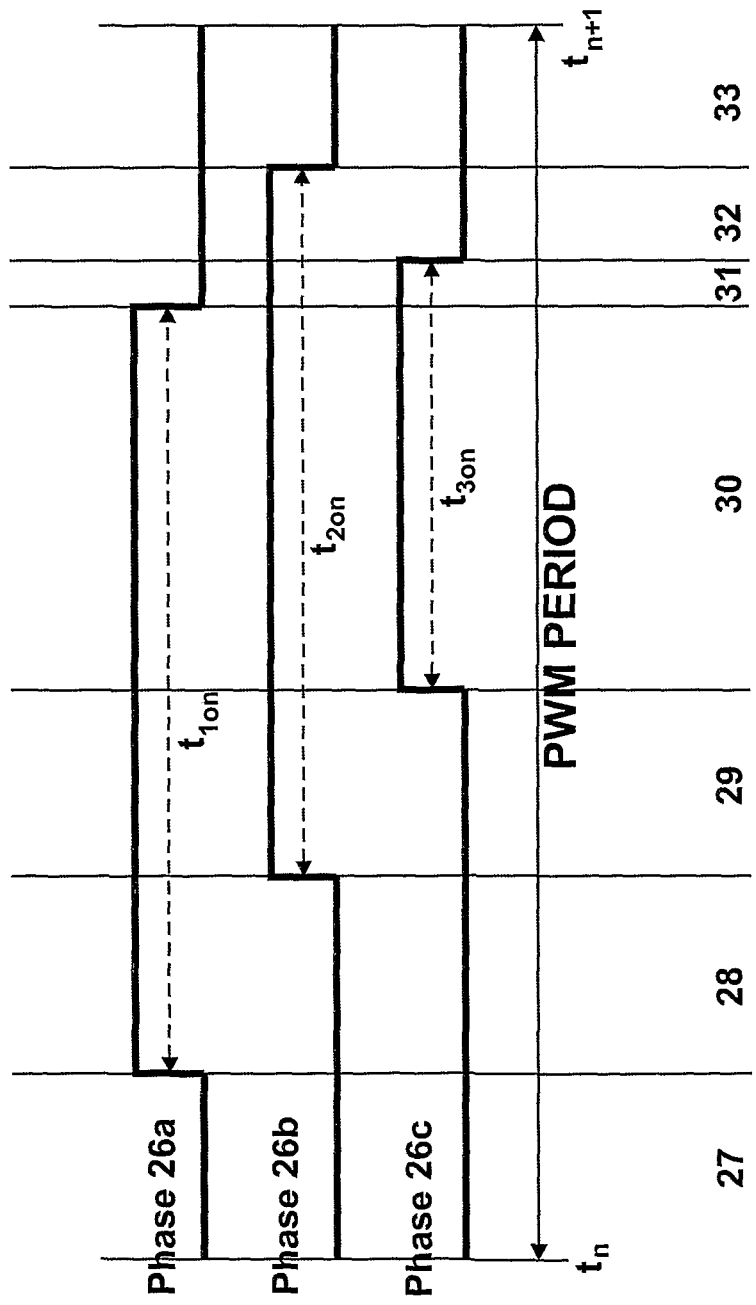
FIG. 3 shows the switching of the switches of the drive circuit of FIG. 2.

Accordingly, the different periods in FIG. 3 give rise to the following currents flowing:

| Period | Current flowing through current sensor |
|---|---|
| 27 | 0 |
| 28 | $i_1$ |
| 29 | $-i_3$ |
| 30 | 0 |
| 31 | $-i_1$ |
| 32 | $i_2$ |
| 33 | 0 |

It can therefore be seen that it is possible to measure the current in each phase at some point through the PWM cycle using a single current sensor.

Indeed, it is only necessary to determine the current flowing in two of the phases; from FIG. 4 it is apparent that $i_1+i_2+i_3=0$, as the currents flowing into the star point 25 must equal the currents flowing out. Any one of the currents can therefore be determined from the remaining two.

Figure 5:
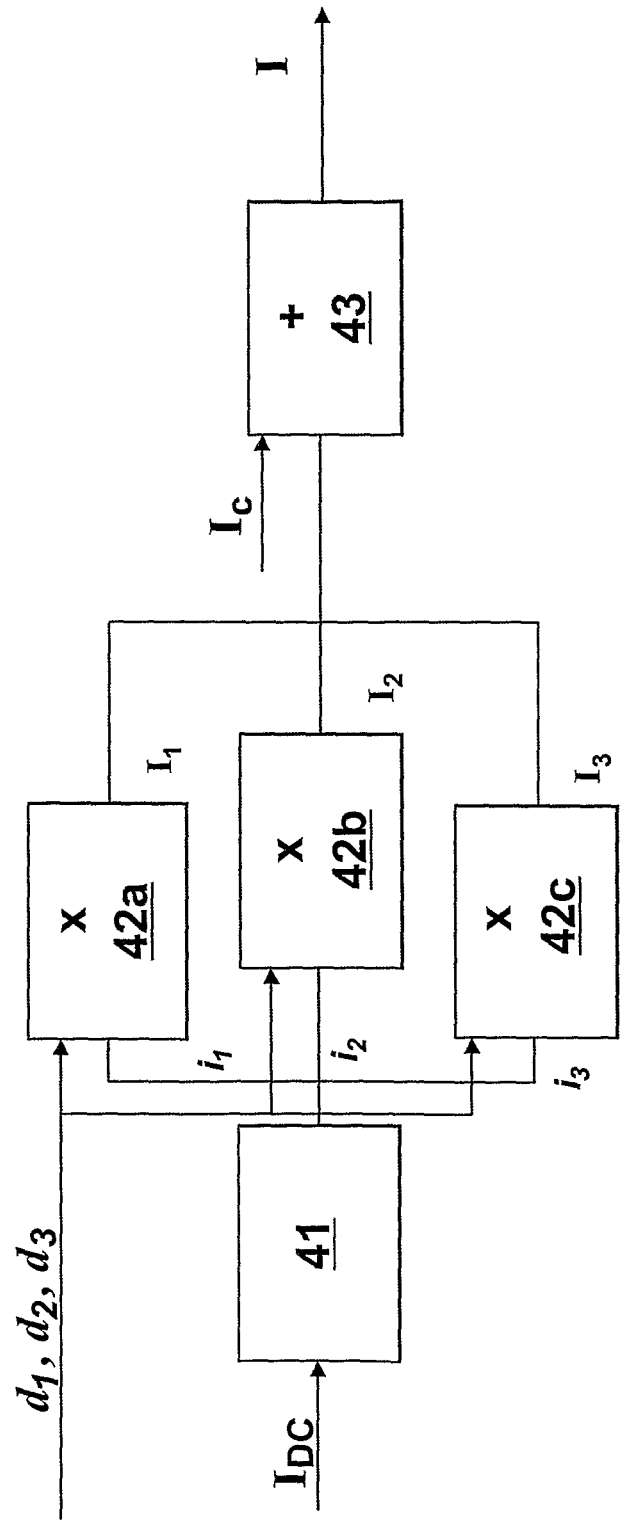
FIG. 5 shows a block diagram of the average current determining circuit of the drive circuit of FIG. 2.

Accordingly, the drive circuit is also provided with an average current determining circuit 40. This is shown in more detail but schematically in FIG. 5 of the accompanying drawings. Block 41 determines the currents in each phase at the relevant points discussed above based on the output $I_{DC}$ of the current sensor 24. This therefore outputs $i_1$, $i_2$, and $i_3$. These signals are passed to product circuits 42a, 4b and 42c.

Each of these blocks takes as an input the relevant current and duty ratio $d_1$, $d_2$, $d_3$ for that phase. The duty ratio is taken from the drive circuit, which has calculated the duty ratios as part of its driving of the motor and generation of the drive signals as discussed above. It is also possible to compensate the duty ratios for the dead-time effects due to switching effects.

The product blocks each calculate the product of the current and the duty ratio to produce an average phase current $I_1$, $I_2$, $I_3$. These are added together in sum block 43. Also added to this sum is a constant current $I_C$. This represents the current drawn by the drive circuit and any power filter etc that is included with the motor. It can be determined by the drive circuit by measuring the current consumed by the motor and drive circuit when no current is flowing through the motor and the motor is at rest.

Accordingly, the output of the sum block 43 is an average current value I, indicative of the average current drawn by the motor taken over the whole cycle. Mathematically:

$$I = \sum_n d_n i_n + I_C,$$

where n is the number of phases.

This may then be output by the average current determining circuit 40 and used elsewhere in the vehicle. Test results, with no compensation for dead time and zero constant current $I_C$, on a 750 W automotive electric power assisted steering system with a 78 A rated battery current gave a worse case error of 1 A over the complete torque-speed envelope of the motor.

This method simply determines an average current draw over one or more PWM cycles, and can automatically account for drive stage losses without having to model the motor. Furthermore, the entire average current determining circuit can be embodied in an ASIC, along with the control circuit for the drive stage.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. A method of determining an average current drawn by an electric motor, the motor comprising a plurality of phases, the method comprising:
   driving each phase of the motor with cycles of a cyclic pulse width modulated drive signal having a first state and a second state and a duty ratio indicative of a ratio of time spent in the first state to time spent in the second state within a cycle of the drive signal,
   determining a current flowing through each phase at an instant in the cycle; and
   determining the average current drawn by the motor over at least one cycle by combining the currents flowing through each phase with the duty ratios for each phase; in which only one current determination per cycle per phase is taken and used in determining the average current.

2. The method of claim 1, in which the step of determining the current in each phase comprises measuring the current in each phase.

3. The method of 1, in which the method comprises measuring the current in each phase using a current sensor in each phase.

4. The method of claim 1, in which a single current sensor is provided in series with the phases, the drive signals being arranged such that there exists for each phase a window in time in the drive signal for that phase where the current through the current sensor is representative of the current flowing through that phase; the measurement of the current in each phase being taken during the window for that phase.

5. The method of claim 1, in which the motor is controlled by a drive circuit arranged to create the drive signals, the drive circuit calculating a demanded duty ratio for each phase, the demanded duty ratio being indicative of the duty cycle of the drive signals with the demanded duty ratios being used as the duty ratio for the relevant phases.

6. The method of claim 5, in which switches are used to switch the drive signals of each phase from said first state to a second state, the method comprising calculating a modified duty ratio from the demanded duty ratio, by allowing for a switching time of the switches in calculating the duty ratio and using the modified duty ratio as the duty ratio in calculating the average current.

7. The method of claim 1, in which the average current determined by the method further comprises a component indicative of the current consumed by the components of the motor other than the phases.

8. The method of claim 7 in which the component indicative of the current consumed by the components of the motor other than the phases is included in the average by adding a constant value to the combination of the duty ratios and the currents.

9. The method of claim 8, including the step of determining the constant value when the motor is at zero speed and one of no current and substantially no current is flowing in the windings phases.

10. The method of claim 1 in which the instant in the cycle for which the current for each phase is determined is not the same for each phase.

11. The method of claim 10, in which determination of the current for each phase is made at an instant when that phase is being driven by a drive signal in the same state as that of the other phases at the instant that the other currents for the other phases are determined.

12. The method of claim 1, in which the step of determining the average current drawn by the motor over at least one cycle is performed by combining the currents flowing through each phase with the duty ratios for each phase without the use of a filter.

13. A method of determining an average current drawn by an electric motor, the motor comprising a plurality of phases, the method comprising:
   driving each phase of the motor with cycles of a cyclic pulse width modulated drive signal having a first state and a second state and a duty ratio indicative of a ratio of time spent in the first state to time spent in the second state within a cycle of the drive signal,
   determining a current flowing through each phase at an instant in the cycle; and
   determining the average current drawn by the motor over at least one cycle by combining the currents flowing through each phase with the duty ratios for each phase by taking the product of the duty cycle and the current for each phase, resulting in an average phase current for each phase.

14. The method of claim 13, in which the average current is determined by combining the average phase currents additively.

15. A control system for a motor having a plurality of phases, the system comprising:
   a drive circuit for the motor that is arranged so as to, in use, generate cycles of a cyclic pulse width modulated drive signal for each motor phase, each drive signal having a first state and a second state and a duty ratio indicative of the ratio of time spent in the first state to the time spent on the second state within a cycle, and to apply the drive signals to the motor phases;
   current sensing circuitry arranged to determine the current flowing through each phase at an instant in the cycle; and
   an average current determining circuit that is included in the drive circuit and which takes as inputs the duty ratios and the currents measured by the current sensing circuitry, the current sensing circuit being arranged so as to output, in use, an average current drawn by the motor in use over at least one cycle; in which only one current determination per cycle per phase is taken and used in determining the average current.

16. The system of claim 15, in which the current sensing circuitry comprises a current sensor for each phase.

17. The system of claim 15, in which the current sensing circuitry comprises a single current sensor in series with the motor phases;
   the drive circuit being arranged so that in use the drive signals applied to the motor phases by the drive circuit are arranged such that there exists for at least one phase a window in time in the drive signal where the current through the current sensor is representative of the current flowing through the relevant motor phase;
   and the current sensing circuitry is arranged to take a measurement of the current in at least one motor phase during the window.

18. The system of claim 15, in which the average current determining circuit includes a product circuit for each phase which has inputs for the duty cycle and the current measured by the current sensing circuitry for that phase and outputs, in use, an average phase current for that phase.

19. The system of claim 18, in which the average current determining circuit also includes a summing circuit that has inputs for the average phase currents and outputs in use an additive combination of the inputs to produce the average current drawn by the motor.

20. The system of claim 15, in which the drive circuit is arranged to calculate a demanded duty ratio for each phase, the demanded duty ratio being indicative of the duty cycle of the drive signals that the drive circuit is to create; the demanded duty ratios being used as the duty ratio for the relevant phases.

21. The system of claim 20, in which the drive circuit includes switches arranged to switch, in use, the drive signals of each phase from said first state to a second state; the average current determining circuit being arranged so as to calculate, in use, a modified duty ratio from the demanded duty ratio, by allowing for a switching time for the switches in the duty cycle of each state, and to use the modified duty ratio as the duty ratio in calculating the average current.

22. The system of claim 19, in which the summing circuit, in use, adds a further component indicative of the current drawn by the components of the motor other than the phases.

* * * * *